July 3, 1956     A. GREENFIELD     2,753,439

VEHICLE CLEARANCE GUIDE

Filed June 18, 1952     2 Sheets-Sheet 1

Inventor:
Alec Greenfield
By *(signature)*
Atty.

July 3, 1956
A. GREENFIELD
2,753,439
VEHICLE CLEARANCE GUIDE
Filed June 18, 1952
2 Sheets-Sheet 2
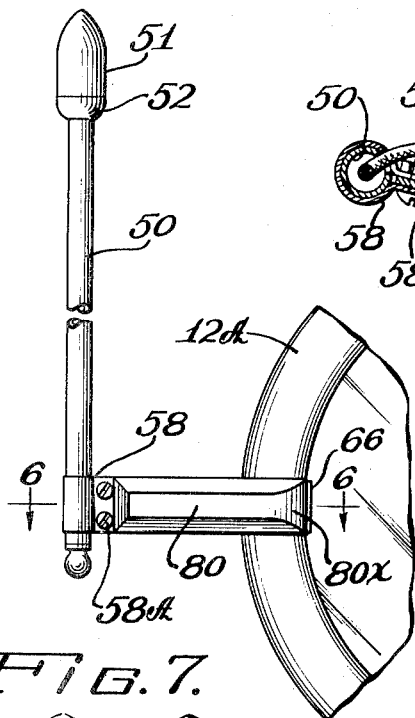
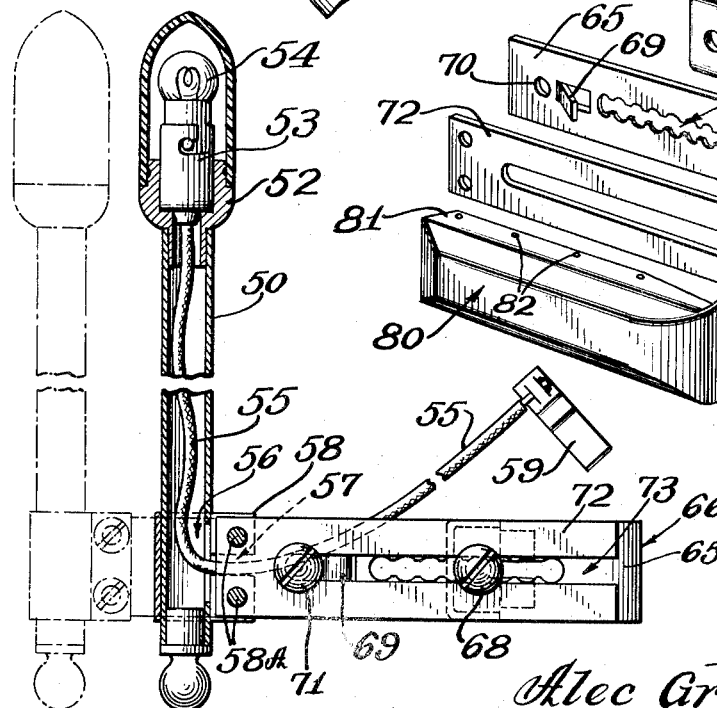
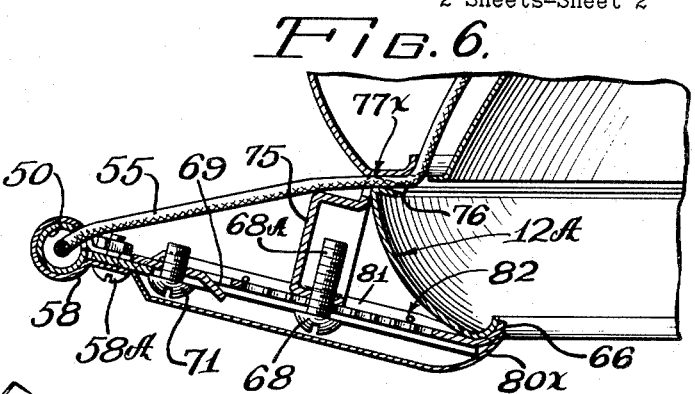
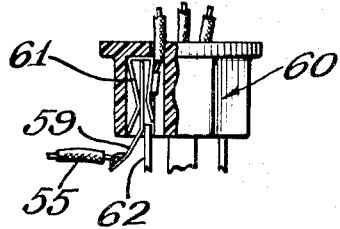
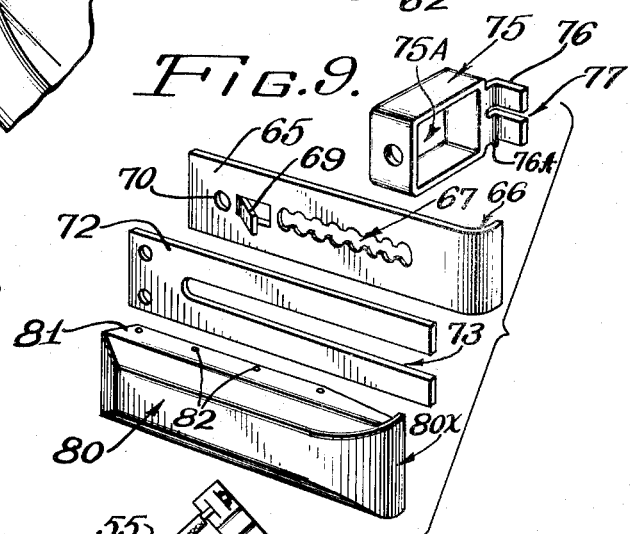
Inventor:
Alec Greenfield
By
Atty.

United States Patent Office 2,753,439
Patented July 3, 1956

2,753,439

VEHICLE CLEARANCE GUIDE

Alec Greenfield, Chicago, Ill., assignor to The Greenfield Company, Chicago, Ill., a copartnership Application January 18, 1952, Serial No. 267,131

12 Claims. (Cl. 240—8.1)

This application is a continuation-in-part of my co-pending application, Serial No. 252,826, filed October 24, 1951, now abandoned, for improvements in a "Combination Headlight Rim and Clearance Guide."

This disclosure pertains to automotive accessories in the nature of fender and parking guides and like devices for indicating to the driver of an automobile the relative position of parts of the body, such as fenders which lie below the normal range of vision from the driver's seat.

One of the principal objects of the invention disclosed is the provision of a fender or clearance guide attached to a foremost part of a fender-mounted headlight.

Another object is the provision of a parking and clearance guide in the form of an upstanding rod attached to a foremost part of an automobile fender.

Another object is the provision of a fender and clearance guide rod and means removably attaching the same to the rim of an automobile headlamp.

A further object is the combination of a clearance indicating rod with an automobile headlamp by use of an especially contrived clamp operable to seize the rim of the lamp.

Still another object is the provision of a clearance indicator or "flag" and an adjustable clamp means for removably attaching the same to a foremost part of an automobile body close to the adjoining side of said body, to wit: the rim of a headlamp mounted in a well in a front fender.

Yet another object is the provision of a clamp for mounting fender guides on a headlight rim, with means for ornamentally concealing part of an attaching bolt.

A further object relates to the provision of a clearance guide of the type heretofore characterized and having an electric lamp with a conductor leading in behind the headlight rim through a passage formed in part by the rim-clamping means for connection by an adapter plug contact with the headlight circuit.

A still further object relates to the provision of a headlight rim clamp structure, including relatively slidable adjusting members and a removable ornamental front covering cap therefor, and a slidable, rear clamp part including an ornamental chambered portion for an attaching bolt and integral rim-seizing jaw means thereon.

Additional objects and aspects of utility and novelty relevant to the disclosure relate to details of the construction and operation of the embodiment hereinafter described in view of the annexed drawings, in which:

Fig. 5 is a fragmentary front elevational view of a modified form of the guide including a guide lamp and ornamental cover means for the headlight rim clamp;

Fig. 6 is an enlarged horizontal sectional detail taken along lines 6—6 of Fig. 5;

Fig. 7 is a vertical sectional detail of the modified guide staff, with parts of the clamping bracket shown in elevation and the cover plate removed;

Fig. 8 is a side elevation, partly in section, of a headlamp connector plug with parts shown in section;

Fig. 9 is an exploded perspective of the principal components of the modified clamp structure.

Figure 1:
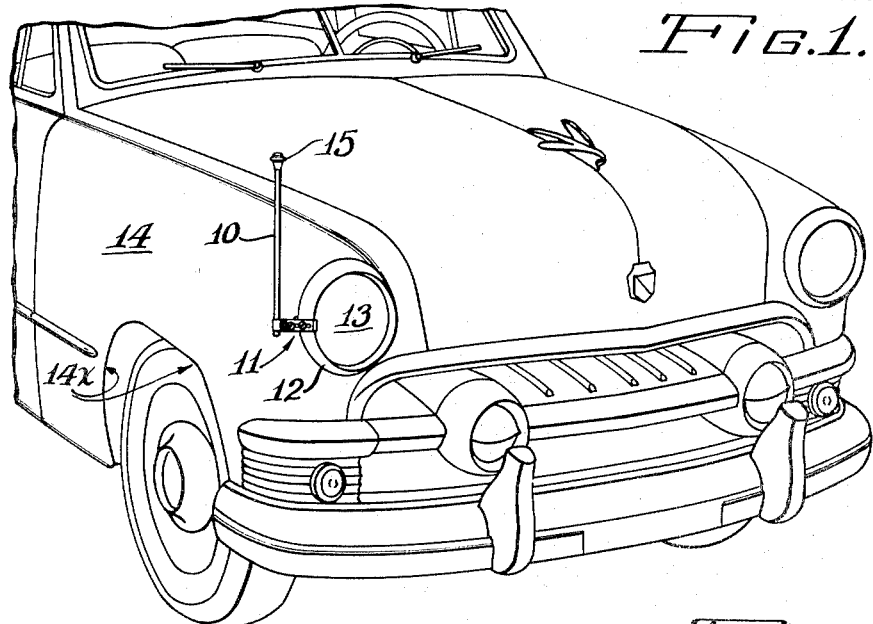
Fig. 1 is a partial perspective view of the front of an automobile illustrating the combination of the clearance guide with a headlight rim.

Referring to Fig. 1, the new guide means includes a short staff or rod 10 secured at its lower end in a clamp means generally indicated at 11, engaged with the rim 12 of a headlamp 13, which is seated in a well formed in the front fender structure 14 of an automobile.

The upper end of the guide rod or staff is provided with a cap 15 in the nature of an ornament, preferably a colored plastic, which lies at an elevation relative to the driver's range of vision from the steering wheel so as to readily be seen without change of position.

The headlamp 13 may be of the "sealed-in" variety, which is secured in the fender well by bolts (not seen) usually lying behind, or concealed by the removable rim 12.

In the current design trends, the fenders 14 are commonly carried quite far forward, so that the headlamps are located correspondingly close to the front of the car. However, the vertical sides or skirt portions of such fenders are projected downward to a great extent, and the wheel opening 14X fits close to the peripheral margins of the wheel, usually leaving a minimum safe clearance for wheel movement in turning.

Various types of clearance guides have been used heretofore, one such guide embodying a rod attached to the margins of the fender along the wheel opening. Such devices are not wholly satisfactory in that they cannot ordinarily be attached to the fender except along the marginal edges of the wheel opening (unless special tools and fixtures are employed). Moreover, such prior devices cannot be positioned satisfactorily at the forward margin of the fender, and such positioning requires a substantially longer guide rod to bring the rod to the proper elevation from its point of attachment to the eye level.

Figure 2:
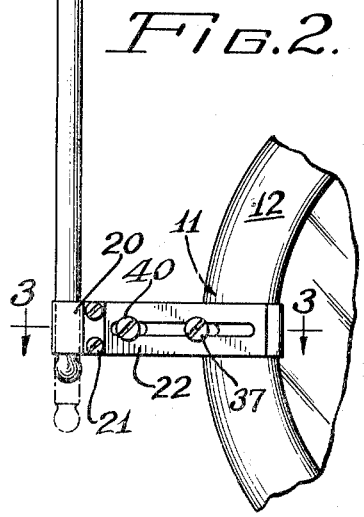
Fig. 2 is a fragmentary front elevation, to enlarged scale, of the guide in combination with a headlight rim.

The novel construction according to Fig. 2 includes the staff or rod 10 in the preferred form of a tube having its lower extremity seated in a bracket, such as the clamp 20, secured by means such as screws 21 to the outer end of an elongated plate 22 forming part of the rim clamp 11.

Figure 4:
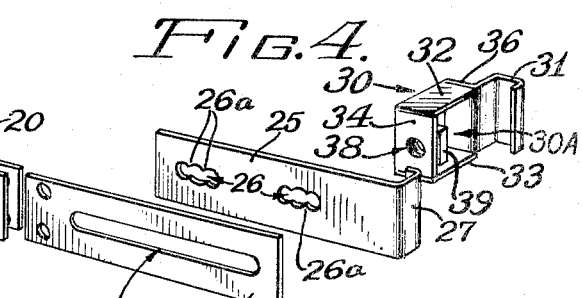
Fig. 4 is an exploded perspective of the principal components of the headlamp rim clamp.

As viewed in Fig. 4, the rim clamp 11 consists in the addition to the outer or adjustable plate 22 of an inner or stationary elongated plate 25, having two horizontally spaced and aligned sets of bolt openings 26 formed therein with scalloped margins, as indicated at 26a, made by punching two or three round holes close together. These holes serve for selective positioning of the clamp bolts as will appear.

At its inner end the stationary clamp plate 25 is turned back upon itself to form a first or outer claw or hook 27 adapted to seize the outer margin of the headlamp rim 12.

The second or companion clamp member 30, as depicted in Fig. 4, consists in a formed member fabricated from an elongated strip of metal in such manner that one end is turned back to define a second offset hook 31, with marginal portions upset to define side walls 32, 33, an end wall 34, and a bottom 35 (Fig. 3), the remaining end wall 36 adjoining and being a continuation of the clamping hook.

The upset wall portions on the companion clamp member 30 define a cup-like compartment or chamber 30A, which is a very rigid extension of the secondary or companion clamping hook 31, and which additionally shields portions of the connecting means or bolt 37 (Fig. 3), which is threaded through a hole 38 in endwall 34 and into a nut 39 likewise confined in said chamber 30A and preferably fixed therein, as by spot welding.

While the hole 38 may be pierced, flared and tapped to threadably receive the bolt 37, it is preferred to employ the relatively heavier threaded means or nut 39 to afford extra and relatively shake-proof holding power.

Figure 3:
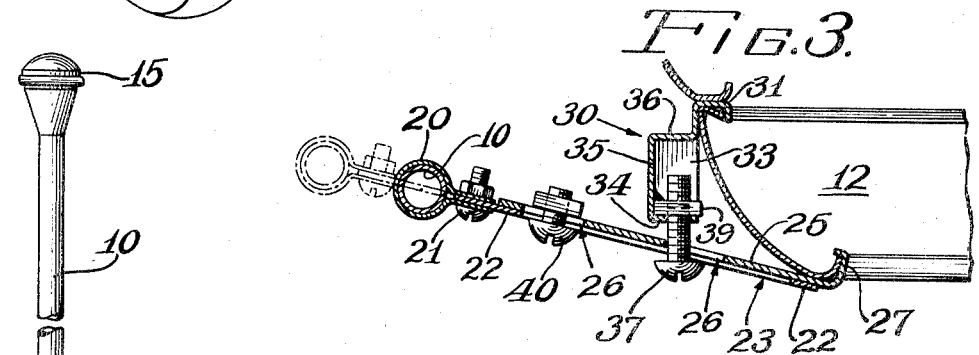
Fig. 3 is a horizontal sectional detail along lines 3—3 of Fig. 2.

The attachment is easily assembled with the headlight rim by removal (or loosening) of the latter in the usual manner, and unscrewing the main clamping bolt 37 until the two clamp jaws or hooks 27 and 31 are sufficiently diverged to span the rim and engage the inner and outer marginal edges thereof in the manner shown in Fig. 3, whereupon the bolt 37 is tightened until the clamp firmly seizes the rim.

If it is desired to adjust the lateral position of the guide rod, the bolt 40 (Figs. 2 and 3) is first loosened before the main clamping bolt 37 is tightened, so that the outer, or rod-carrying bracket plate 22 may be slid toward or away from the headlamp (as into the dotted line position shown in Fig. 3), whereupon the bolt 40 may be tightened, and thereafter the clamp bolt 37 may be tightened.

Vertical adjustment of the guide rod 10 may be effected by loosening the bolts 21 and sliding the rod up or down in the small clamp-like rod bracket 20 to procure the proper elevation of the top or sighting portion of the rod.

The headlight rim structures on different makes of automobile are not uniform, particularly as to width and angle or pitch between the inner and outer peripheral edges, but the disclosed construction permits a range of adjustments to fit a great variety of rim sizes and shapes by reason of the offsetting of the inner clamping hook 31 from the bolt-receiving parts 34, 39, and the provision of the elongated and scalloped or contiguous bolt holes 26 in which the main bolt 37 can seat in a plurality of relatively stable positions at various angles relative to the outer clamp plate 25 when the inner clamp member 30 assumes one or another angular position depending on the slope and size of the headlight rim.

It will now be apparent that the disclosure affords a new guide means in combination with the rim of an automobile headlight, and characterized mainly in providing for horizontal and vertical adjustments, adaptability to different sizes and shapes of rim, with ease of installation, removal, or adjustment of the attaching means, concealment of portions of the clamping bolt with ornamental contributions from the chambered portion or housing formation 30A on the clamp partition 30.

The lamp-rim mounting, in addition to providing a relatively safer location for the guide device against dislodgement by minor collisions (as was the danger with guides attached to the fender skirt and rim), also provides a better guide by locating the indicator far forward toward the leading margins of the front wheels. This is important because the driver does not need to turn his head (as is the case with guides attached to the sides of the fenders) to sight the tip of the guide rod, but needs only to shift the eyes very slightly or not at all where only one guide rod is employed. In the case where two guides are used (one on each front lamp) there is still only the slightest eye movement required to sight for clearance.

A modified form of the lamp-mounting guide structure, as depicted in Fig. 5, includes a vertically adjustable staff 50 surmounted by an ornamental cap 51 in the nature of a translucent plastic shell, which is adapted to house an electric lamp energized by an adapter-plug connection with the appertaining headlight terminal plug.

In the sectional view of Fig. 7, the modified guide includes a metal socket mount 52 secured at the upper end of the staff 50, and a lamp socket 53 seated in said mount to retain a small lamp 54. A conductor 55 leads from the socket through the staff to emerge therefrom through an elongated slot 56 near the foot thereof and thence through bifurcation 57 in the staff clamp 58.

At the outer end of conductor 55 is a thin spring metal adapter terminal 59 which fits into one of the spring contacts 61 of the usual terminal plug 60 for the sealed-in variety of headlamp. Such lamps have plug terminals (usually three) one of which, e. g. 62, fits into the contact 61 alongside the adapter contact 59, conductor 55 passing through opening 77 (as at 77X, Fig. 6) for this purpose. The return or ground connection for the guide lamp 54 is effected through metal staff 50, the rim-clamp means to the grounded car body.

The modified rim-clamp structure, as viewed in Fig. 9, includes an inner, elongated and relatively stationary plate 65 provided at one end with an offset clamp-jaw projection 66, and along its median regions with a series of contiguous bolt holes overlapped to produce in effect a horizontally elongated slot 67 having upper and lower margins provided with a series of scallops or serrations whereby a setting bolt 68 (Fig. 6) for the companion movable clamp element may be disposed in a plurality of positions and set firmly home without danger of shifting.

Near the outer end (remote from jaw 66) of the stationary clamp plate 66, is an extruded stabilizing lug 69 (Fig. 9), and at one side of this, a tapped bolt hole 70 for a set screw 71 (Fig. 6).

A companion bracket plate 72 (Fig. 9) is provided with an elongated median slot 73 opening into one edge of the plate, and of a width to fit closely but slidably with the lug 69. Thus, when set screw 71 (Fig. 6) is in position but loose (and bolt 68 is loose) the outer slidable bracket plate 72 can be moved horizontally back and forth but will be prevented from rocking by lug 69.

As viewed in Fig. 9, the modified companion, movable clamp member 75 is a chambered stamping which is substantially like the member 30 of Fig. 4 in that it is a cubicle forming a chamber 75A with one open side and an integral jaw 76 offset therefrom.

However, the chambered clamp 75 of Fig. 9 is distinguished in that the integral offset clamping jaw 76 thereof is bifurcated to provide along slit 77 leading from a point very close to the appertaining end wall of the cubicle around a bend 76A in jaw offset 76 to afford a wire passage to clear the guide-light conductor 55 (as in Fig. 6) between headlight rim 12A and the fender well for the headlamp.

The installation and adjustment of the stationary clamp plate 65 (Fig. 9), the bracket plate 72, and the movable chambered clamp 75, is substantially the same as heretofore described for the embodiments of Figs. 3 and 4, in that the movable chamber or companion jaw member 75 (Fig. 6) has its jaw portion 76 thrust in behind the headlight rim 12A, while the stationary plate jaw 66 seizes the front margin of said rim, whereupon the screw 68 is located in the desired serration of slot 67 and turned home to grip the rim between jaws 66 and 76, with the inner portions of set screw 68 substantially housed and concealed in the chambered part of clamp member 75. Set screw 71 is then turned home.

When the staff 50 is equipped with the lamp means 54 and conductor-adapter means 55—59, the wire is led into the lamp well and the adapter plug 59 inserted into the lamp connector block 60 (as explained in view of Fig. 8), and the conductor fitted into the clearance slot 77 of jaw 76 before the headlamp rim is screwed in place.

The staff 50 is attached to the rim clamp assembly (Figs. 6 and 7) by a clamp band 58 substantially identical to the bracket 20 of Fig. 4, except that the band 58 has the bifurcation 57 (Fig. 7) on one of its wings to permit passage of conductor 55 from the staff tube 50. This clamp band or bracket 58 is attached to the slidable plate 72 by bolts 58A, Fig. 6).

A further feature of the modified structure is the provision of an elongated cover plate 80 (Fig. 9) having upper and lower edges, as at 81, adapted to spring over the horizontal long edges of the assembled plates 65 and 72, there being a series of bosses 82 along the gripping edges 81 of the cover to snap over the plate edges to secure the cover in position. One endwise portion 80X of the cover shell is rounded-over conformably with the curvature of stationary jaw 66 so as to shield the latter closely (as in Figs. 5 and 6).

The modified embodiment of Fig. 9, for example, is horizontally adjustable (inwardly or outwardly of the headlamp) in the same sense, and in substantially the same manner, as the device of Figs. 2 and 4, but has the added advantages of being thus adjustable to a greater degree owing to the provision of the open-ended slot 73 and lug 69 (Fig. 9).

The snap-on, conformed cover shell 80, conceals substantially all of the forwardly and downwardly visible structure of the headlight clamping assembly, and cooperably with the chambered clamping member 75 (or 30) affords a highly ornamental dress for the clamping mechanism.

I claim:

1. In a mounting clamp for attaching a clearance device to a headlight rim, a first clamp member having an endwise hook for engagement with the outer peripheral margins of a headlight rim, a second clamp member forming at least a five walled chamber, and an offset hook projecting from one of said walls for engagement with the inner peripheral margin of said rim, threaded means carried in alignment with a bolt opening in a wall of said chamber, said first member having a bolt passage, a clamp bolt projecting through said passage and threadable into said threaded means and into said chamber in which the appertaining portions of said bolt are at least partly shielded, and means carried by said first member for supporting a said clearance device.

2. A structure according to claim 1 in which the bolt passage in said first member is in the form of an elongated slot permitting said bolt to assume a plurality of angular positions relative thereto, whereby said clamp members are adjustable to the width and slope of the headlight rim.

3. A structure according to claim 1 in which said means for supporting said clearance device includes an elongated plate slidable along said first member and having an elongated slide-adjusting slot registering with said bolt passage and through which said bolt is projected as aforesaid, a clamp removably attached to an end of said plate for support of said clearance device, and a second bolt means passing through said slide-adjusting slot and secured to said first clamp member in positions of adjustment thereon, cooperably with the clamping action of said clamp bolt.

4. In an automobile clearance guide a guide staff; a lamp mounted on said staff; a conductor connected to said lamp for energizing same from the automobile lighting system; a supporting clamp for the staff and including jaw means for seizing a headlight rim, said jaw means including a jaw member adapted to lodge behind the said rim and having a conductor passage formed therein to afford entrance for said lamp conductor in behind the headlight; said conductor having adapter-connection means connectable with the headlight circuit for diverting energizing current from said headlight for said guide lamp.

5. The combination, with an automobile headlight mounted in a fender well and including a metal rim affording an electrical conduction path to the body ground circuit of the automobile together with a plug socket in said well for energizing said headlight, of clearance guide means comprising, to wit: a metal staff; metal clamp means attaching said staff to said headlight rim, said clamp means including a jaw part engaging said rim at the rear thereof in between the rim and fender well; a guide lamp mounted on said staff and having one terminal connected to the staff for ground connection through said clamp means and rim to said body ground, and another terminal connected to an adapter conductor leading thorugh the staff and into said well behind said rim; said conductor including an adapter plug engageable in said plug socket to energize said guide lamp concurrently with said headlight.

6. In combination with an electric automobile headlight of the type mounted in a body well and having a removable rim for the light, a clearance guide including a sighting member; a clamp carrying said sighting member and including two adjustable jaw members for seizing said rim; a guide lamp carried by said sighting member; circuit means for the guide lamp for energizing the latter concurrently with the headlight from the existing circuit therefor, said circuit means including at least one conductor entering said well between said rim and body parts adjoining said well, said conductor including adapter means disposed in the well and connecting in said circuit for the headlight.

7. An automobile clearance guide structure adapted for attachment to an electric headlight having a removable rim attached to a part of the car body having an adjoining opening in which the headlight and electrical circuit connections therefor are disposed, said guide structure comprising: an upstanding staff, a guide lamp carried by said staff; clamp means attached to the staff and including adjustable jaw means for seizing said rim and including a jaw part adapted to engage a portion of the rim adjacent said opening substantially between the rim and said body part, said jaw part including a cut-out formation to accommodate conductor means in passage between the rim and said body part; and conductor means connected with said lamp for completing an energizing circuit therefor behind said rim through said jaw passage and into said body opening, and means for connecting said conductor means with an energizing circuit for said headlight for energization of the guide lamp concurrent with the headlight.

8. A clearance guide and clamp for use with automobiles having a headlight situated in a front fender well and equipped with a removable rim, said guide and clamp comprising: a sighting staff; a bracket and means attached thereto for supporting said staff in upright position at one side of said rim and outwardly therefrom close to the side of the fender in which said well is situated; clamp means carried by said bracket and including a pair of front and rear jaws, the latter of which is engageable behind said rim and the other of which is engageable with the front of the rim; means for drawing said jaws together to seize the rim and a compartment formed as an integral part of said rear jaw and into which a portion of said drawing means is received to be shielded from view in part, at least, by the compartment.

9. A clearance guide for attachment to a removable rim on an automobile headlight situated in a fender well, said guide including an upright sighting staff, a bracket arm and means removably attaching the same to said staff with the bracket extending horizontally therefrom; a horizontally movable front jaw member and a cooperable rear jaw member; adjustable tightening means engaged with said bracket arm and said jaw members for attaching the latter to the bracket, said tightening means being adjustably movable to loosen said jaw members together in immovable condition seizing said rim with the rear jaw member engaged with a rearward portion of the rim and said front jaw member engaged with a forward position of the rim; said jaw members being slidable horizontally of said bracket arm when said tightening means is loosened and at least one of said jaw members being movable horizontally relative to the other to widen the rim-seizing gap therebetween to fit rims of different width, said rear jaw member having a chamber portion, and said tightening means having a headed and threaded member passing through a part of said front jaw member, and said bracket arm, and having a projecting portion threadedly engaging a wall of said chamber portion and projecting into the chamber different amounts depending upon the gap between said jaw members, said chamber portion affording a substantial shielding means for the part of the tightening means projecting therein.

10. A clearance guide according to claim 9 and further characterized in that said staff has an electric lamp mounted thereon and an electrical conductor adapted for connection in an energizing circuit with said headlight in said well, said conductor leading from the lamp and adapted for entrance to said well behind said rim; and said rear jaw member has a cut-out portion defining a passage to receive a part of said conductor along a portion of the rear jaw member which confronts the rearward portion of said rim engaged by the rear jaw member in seizure as aforesaid and means connecting with said lamp to complete said circuit therefor.

11. A clearance guide for an automobile headlamp having a removable rim, said guide comprising: a sighting staff; clamp means including a first elongated plate member having a hooked end to engage the outer margin of said rim; a second clamp member having an offset hook to engage the inner margin of said rim; a bolt carried by the first member and threadably engaging with a part to hold said second member to clamp said members for seizure of the rim by said hook parts; means adjustably mounting said sighting staff on at least one of said clamp members, said second clamp member including a chamber in which at least a portion of the engaging bolt and said holding part are housed and at least partly concealed.

12. A clearance guide for attachment to the rim of an automobile headlight, said guide comprising a pair of clamping members each having a hooking portion to engage one of the adjoining opposite peripheral margins of said rim, and one of said members having an elongated slot with scalloped longitudinal margins for seating a bolt at different points therealong; a bolt seatable as aforesaid in said slot and having a portion for projection through the second clamping member; means carried by the second member and threadedly engaged by said bolt for securing said members together in clamping action, and chamber-defining means integrally a part of said second member at least partially concealing the engaging portions of said bolt from view, said bolt being movable to said different positions whereby the second clamp member is angularly adjustable relative to the first member for engaging rims of different width and pitch between said opposite adjoining rim margins.

References Cited in the file of this patent

UNITED STATES PATENTS

| | | |
|---|---|---|
| 1,802,976 | Kueppers | Apr. 28, 1931 |
| 1,861,148 | Withrow | May 31, 1932 |
| 1,877,428 | Rensonnet | Sept. 13, 1932 |
| 1,905,623 | Dietz | Apr. 25, 1933 |
| 1,918,802 | Fleischer | July 18, 1933 |
| 2,046,581 | Reeves | July 7, 1936 |
| 2,121,317 | Cohen | June 21, 1938 |
| 2,270,587 | Hall | Jan. 20, 1942 |
| 2,286,448 | Wahlberg | June 16, 1942 |
| 2,553,963 | Dzus | May 22, 1951 |
| 2,634,928 | Hawes | Apr. 4, 1953 |